Figure 1:
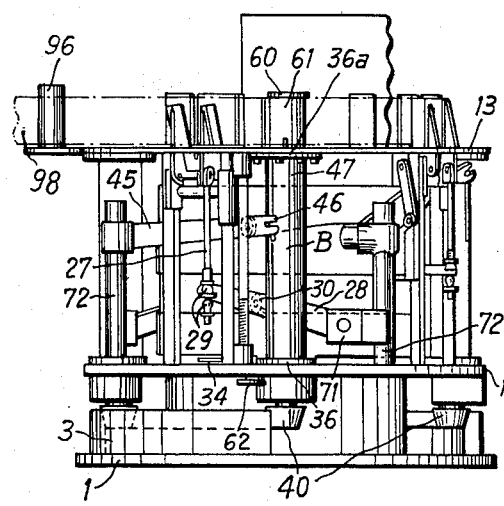

April 4, 1961 F. WIESER 2,977,644
MACHINE FOR CUTTING AND WINDING FLEECE AND THREAD INTO PADS
Filed Aug. 4, 1959 6 Sheets-Sheet 1

INVENTOR.
FRIEDRICH WIESER
BY

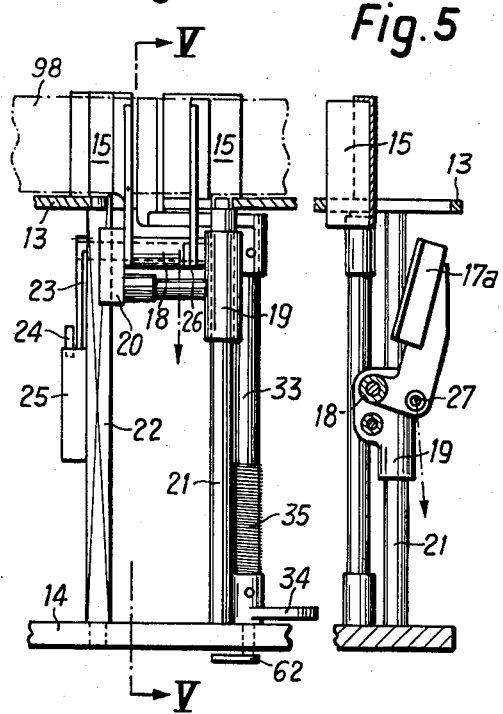

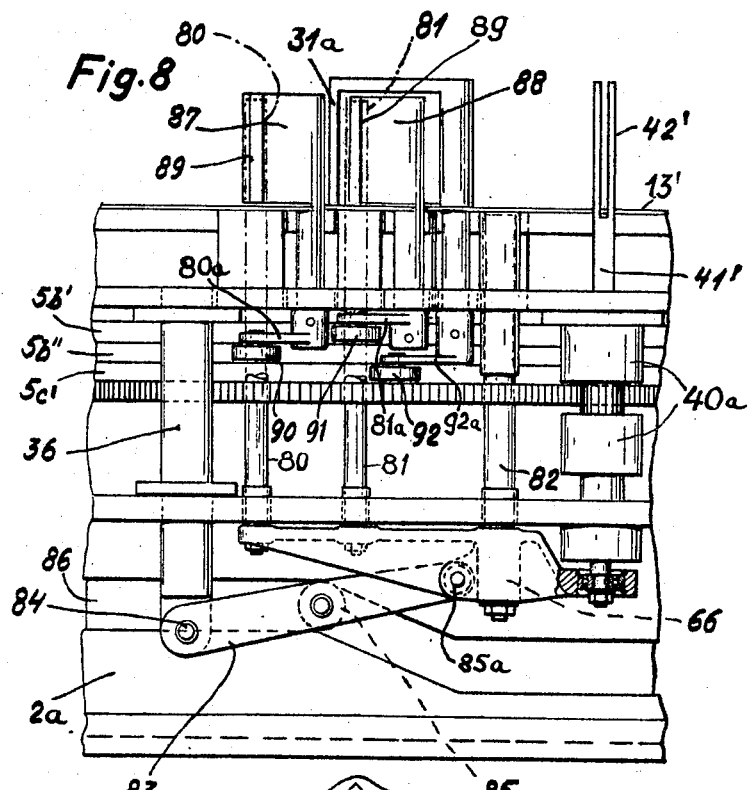
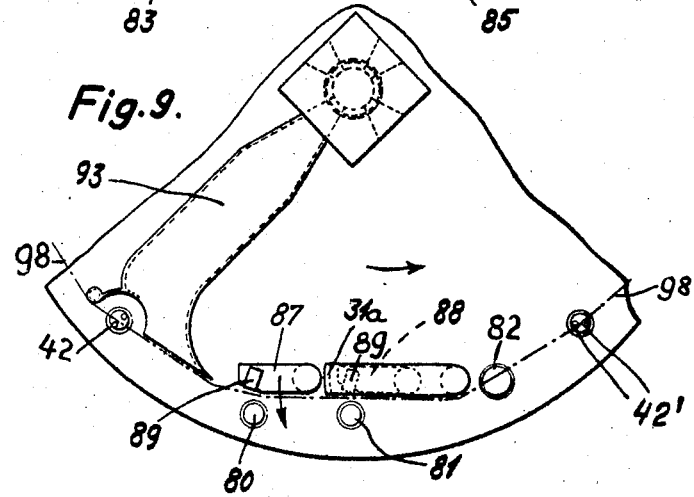

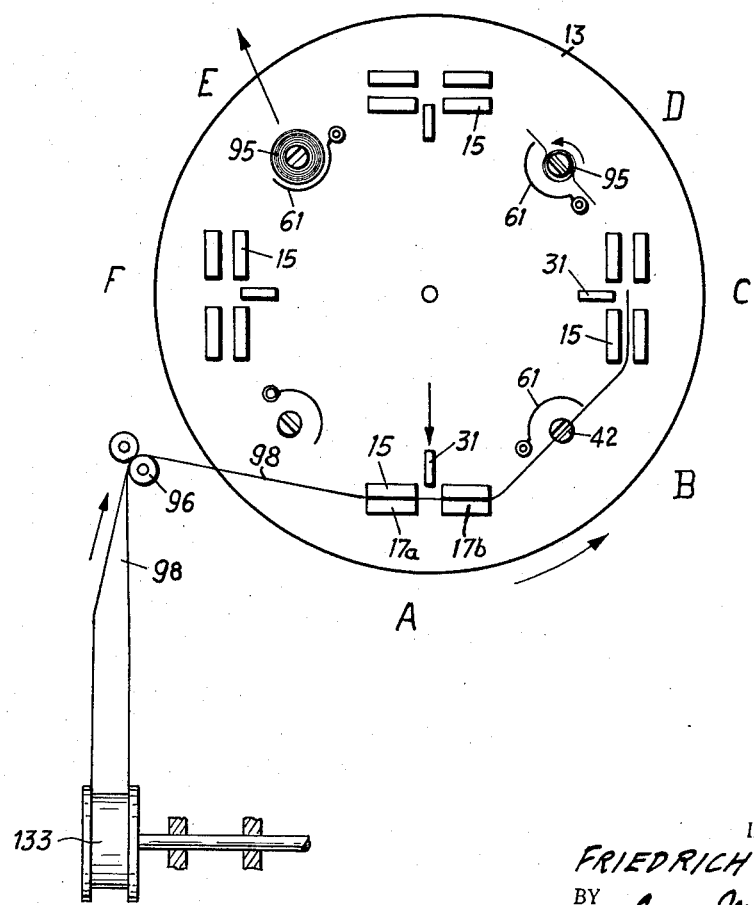

April 4, 1961 F. WIESER 2,977,644
MACHINE FOR CUTTING AND WINDING FLEECE AND THREAD INTO PADS
Filed Aug. 4, 1959 6 Sheets-Sheet 5

INVENTOR.
FRIEDRICH WIESER
BY

United States Patent Office 2,977,644
Patented Apr. 4, 1961

2,977,644

MACHINE FOR CUTTING AND WINDING FLEECE AND THREAD INTO PADS

Friedrich Wieser, 14 Beatrix Gasse, Vienna, Austria

Filed Aug. 4, 1959, Ser. No. 831,579

3 Claims. (Cl. 19—149)

The present invention relates to machines for the production of articles in the form of pads made of cotton, cotton-wool fleece and like material.

This invention is a continuation-in-part application, being based on the application Serial No. 567,027, filed February 21, 1956, now abandoned.

Known machines heretofore used for the production of cotton pads consist of many complex interacting mechanical parts.

Consequently these machines require a large power input for their operation and occupy a large floor area. Furthermore the maintenance cost for these types of machines is quite high.

It is therefore an object of the present invention to provide means contributing to a simplified and highly economical machine for continuous production of pads from cotton, cotton-wool fleece and like fibrous material.

It is another object of the invention to provide means affording a compact and readily accessible machine, whose operation may be easily surveyed.

These and other objects are achieved by providing a circular base plate for mounting all stationary and movable parts above said base plate. For instance, a stationary circular drum is axially secured to the base plate. A rotatable circular tool plate is then axially mounted above the cam drum. Several holding devices are movably mounted on the tool plate for holding the fleece during the cutting and winding operation of the machine. A corresponding number of cutting and winding tools are also movably disposed on the tool plate.

In this type of a machine the fleece is intermittently pulled off a delivery spool and then worked by the various tools mounted on the tool plate. The operation of the machine is continuous since the various tools of the machine are sequentially actuated by a plurality of cams, linkages and other gears.

In a preferred embodiment of this invention the tool plate is axially supported by a tubular support secured to the base plate by the agency of an intermediate rotatable circular plate and a rotatable axial cylinder. The control means for the various tools are arranged below the tool plate and above a rotary carrier ring which is connected to the tool plate by the agency of several axially spaced tubular supports.

The clamping device for the fleece consists of two vertically movable clamping jaws adapted to be swivelled against a press plate mounted on the tool plate, and a movable cutter disposed between said clamping jaws.

The clamping jaws of the machine are vertically actuated by the agency of a first control lever having a roller rotatably secured thereto that slides along a circumferentially and horizontally disposed cam surface of the stationary cam drum. The swivelling motion of the clamping jaws is effected by a second control lever having a second roller rotatably secured thereto that slides along a vertically disposed cam surface. A tearing cutter tool mounted on the tool plate can be swivelled towards the freely stretched fleece and tears the fleece without actually cutting it.

In order to permit the tearing of the fleece by the tearing cutter tool the clamping jaws are spaced sufficiently from each other to freely stretch the clamped fleece between them and permit the tearing cutter to move transversely therebetween to tear the clamped fleece.

A winding fork projects through an opening of the tool plate and is secured to an axially movable winder shaft disposed within a slotted tubular support. The winder shaft has a friction wheel secured to its lower end which slides along a stationary circumferential friction rim and thereby rotates the winding fork. The winder shaft is mounted in an axially movable bush within the slotted tubular support. The winder shaft is axially displaced by means of a control lever operatively connected thereto via a pair of lugs slidably disposed in the slots of the tubular support. The control lever has a rotatably secured roller which slides along a circumferentially and horizontally disposed cam of the stationary cam drum and controls thereby the axial movement of the winder shaft via the slidably disposed pair of lugs.

The gear drive for the thread stretching and knotting device are mounted on the rotatably circular plate that forms a part of the support of the tool plate.

It will be obvious that several sets of tools may be mounted on a tool plate, each set of the tools producing the operative steps on the fleece of cutting the same, providing thread and winding the cut fleece. In the figures described below four sets of tools are illustrated, by way of example, as being mounted on the tool plate.

Figure 3:
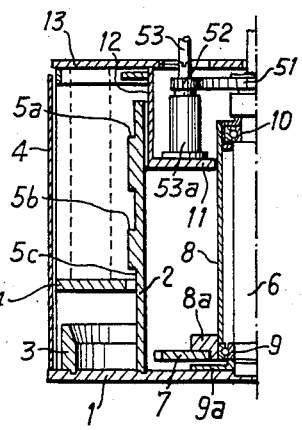
Figure 2:
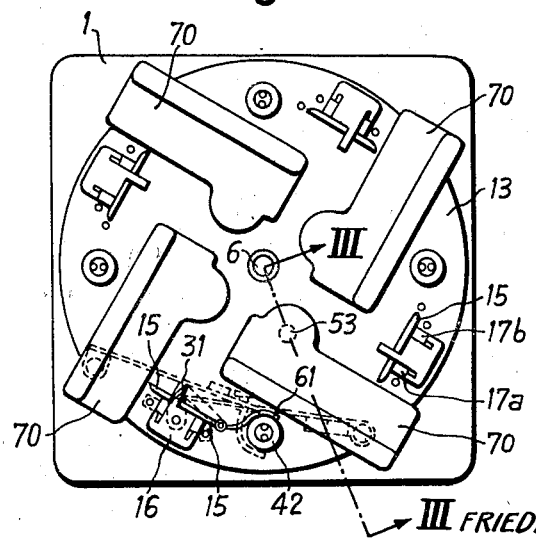
Figure 11:
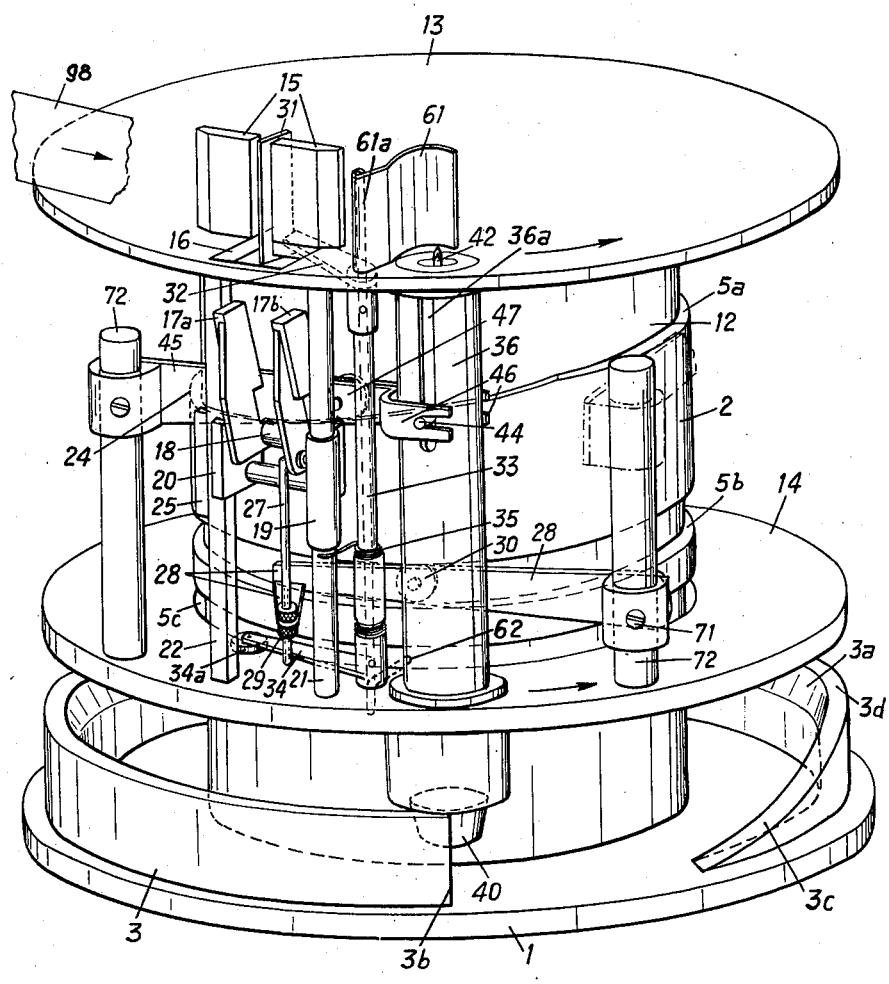
Figure 12:
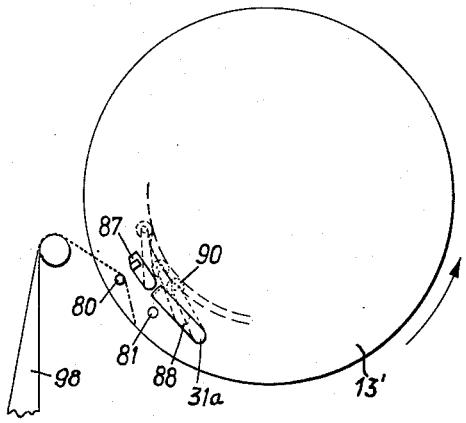
Figure 13:
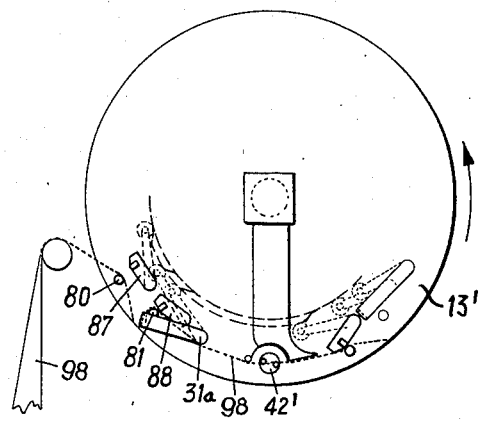
Figure 14:
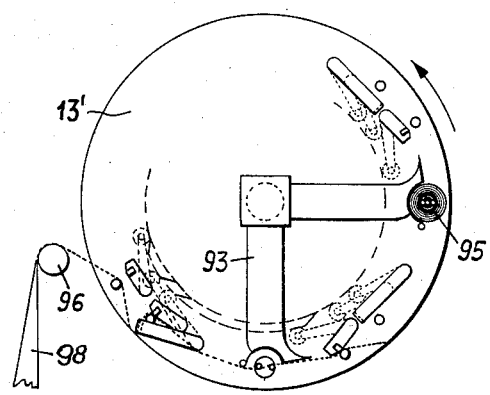

The novel features which are considered as characteristic for the invention are set forth in particular in the appended claims. The invention itself, however, both as to its construction and its mode of operation, together with additional objects and advantages thereof, will be best understood from the following description of specific embodiments when read in connection with the accompanying drawings, in which:

Fig. 1 is a side elevation of the machine;
Fig. 2 is a simplified plan view of the machine;
Fig. 3 is a vertical section on the line III—III of Fig. 2;
Fig. 4 is a partial side elevation showing in detail the clamping mechanism of the machine;
Fig. 5 is a section on line V—V of Fig. 4 showing the clamping jaws in their lowered position;
Fig. 6 is a plan view of Fig. 4;
Fig. 7 is a partial vertical section showing in detail the winding mechanism of the machine;
Fig. 8 is a partial side elevation of a modified version of the machine;
Fig. 9 is a plan view of Fig. 8;
Fig. 10 is a plan schematic view of the machine illustrated in Fig. 1 showing the different positions that parts of the machine occupy during the operation of the machine;
Fig. 11 is a perspective illustration of the machine shown in Fig. 1 showing one set of tools;
Figs. 12 to 14 are plan schematic views of the machine illustrated in Fig. 8 showing the different positions that parts of the machine occupy during the operation of the machine.

Referring specifically to the drawings there is disclosed on Figures 1 and 11 a machine having a base plate 1. A circular friction ring 3 having an inner guide face 3a, an end face 3b and an inclined face 3c is mounted on said plate 1. The entire machine is enclosed in a circular protective housing 4 (see Fig. 3).

A stationary cam drum 2 coaxial with the friction ring 3 is mounted on the base plate 1. The drum 2 has two circumferentially and horizontally disposed cam tracks 5a and 5b (see Figs. 3 and 11). The cam tracks 5a and 5b are adapted to vertically guide rollers 47 and 30. A roller 34a is urged against the cam drum 2 by spring 35 and horizontally guided along said cam surface (see Fig. 11). Centrally within the machine a drive shaft 6 extends axially upwards and is supported in two roller bearings 9 and 10 (see Fig. 3) within a tubular housing 8. The lower bearing 9 is supported by an annular plate or the like 9a. An annular plate 11 is secured to the housing 8. This annular plate 11 in turn supports a sleeve 12 and the tool plate 13. The tool plate 13 is thereby supported via sleeve 12, whereas the annular plate 11, the housing shell 8 and the bearing 9 rest on annular plate 9a. A slotted tube 36 is secured to the undersurface of the tool plate 13 by the agency of an annular flange section 36a and to the annular support plate 14 by means of an annular flange section 36b (see Figs. 1 and 11). The annular support plate 14 is supported thereby by the tool plate 13 via the slotted tube 36 and the flange sections 36a and 36b.

The machine is driven by a conventional electric motor or the like which is not shown and does not form part of the subject matter of this invention. The motor drives the machine via a pinion, sprocket wheel, chain or the like which is operatively connected to the annular toothed rim portion 7. The latter is secured to the housing 8 by means of the flange 8a. A bush 53a rotatably supporting a shaft 53 is secured to the upper surface of the annular plate 11. A gear wheel 52 is axially mounted on the shaft 53 and is in meshed engagement with a gear wheel 51 secured to the centrally located fixed shaft 6. Meshed gears 52 and 51 form a sun gear so that when the annular plate 11 is rotated via the housing 8, flange 8a and tooth rim portion 7, the shaft 53 due to the meshed engagement of gears 51 and 52 rotates in the opposite direction. The shaft 53 is operatively connected to a known type of thread stretching and knotting device 70 mounted on the tool plate 13 (see Fig. 2). The thread stretching and knotting device does not form the subject-matter of the present invention and in view thereof is not shown in detail.

The clamping device for the fleece is illustrated in detail in Figures 4, 5, 6 and 11. The fleece 98 is indicated by a broken line. Any suitable or conventional means for feeding the fleece 98 from a spool 133 about a roll 96 may be provided.

Two press plates 15 are mounted on the tool plate 13 adjacent to an opening 16. Two rods 21 and 22 mounted between tool plate 13 and annular support plate 14 respectively slidably support via sleeve members 19 and 20 the clamping jaws 17a and 17b. A connecting shaft 18 rotatably mounted in sleeve members 19 and 20 integrally connects clamping jaws 17a and 17b so that the two jaws move jointly at all times. The swivelling actuation of the clamping jaws 17a and 17b about shaft 18 is effected by a vertical cam member 25 connected to the rod 22. A lever 23 having a roller 24 rotatably mounted on its end and being secured to shaft 18 is slidably disposed on cam member 25 so that when the clamping jaws 17a and 17b are urged upwardly, a swivelling motion of the jaws toward the press plates 15 about shaft 18 takes place (see Fig. 4).

The vertical movement of the jaws 17a and 17b along rods 21 and 22 is effected by a lever 28 which carries a roller 30 and is pivotally connected via pin 71 to post 72. The roller 30 slidably engages cam surface 5b of the stationary cam drum 2 and thereby vertically moves together with lever 28. A control rod 27 is adjustably secured to lever or bar 28 at its lower end via adjusting screw 29 and at its upper end to clamping jaw 17b. The vertical motion of clamping jaws 17a and 17b is thereby effected via control rod 27, lever or bar 28, roller 30 and cam surface 5b.

The clamping device operates as follows:

The clamping jaws 17a and 17b together with sleeve members 19 and 20 are raised in a position by the control bar 27 through opening 16 of the tool plate 13. In the range of the control cam 25 the pair of jaws 17a and 17b are then simultaneously swivelled toward press plates 15 clamping by means of roller 24, control rod 23 and shaft 18 the fleece 98 against the press plates 15. On rotation of the machine, the fleece 98 is pulled along so that it contacts the next following clamping device on rotation through 90° and is clamped there as well (see Fig. 10).

A cutter 31 is arranged between two press plates 15 and is supported by lever 32 which is connected to a hollow vertical cutter shaft 33. The latter is pivotally mounted between annular support plate 14 and tool plate 13. A control lever 34 carrying a roller 34a is rotatably secured at its lower end to shaft 33.

Cam surface 5c of the cam drum 2 guides cutter 31 into an operative position by rotating the shaft 33. The return coil spring 35 is operatively connected to shaft 33 and returns cutter 31 to its inoperative position. The rotary movement of the hollow shaft 33 forces the cutter 31 against the freely stretched fleece between the press plates 15 severing the fleece thereby. It should be noted that since the cutter has no cutting edge it gives the fleece a smooth tearing edge when severing it by pulling its fibres apart.

The thread stretching and knotting device 70 operates simultaneously with the cutter 31 by winding a thread around the vertical fleece and subsequently knotting the wound thread. This device 70 does not form part of the invention and is therefore not shown in detail. (See U.S.A.—Pat. No. 2,873,133.)

The winding device is situated next to the clamping and cutting device. It comprises the partially slotted tube 36. An interior tube 39 is supported within the tube 36 by the agency of ball bearings 37 and 38 (Fig. 7). A friction roller 40 slidably disposed in a roller 40a is connected to the lower end of the interior tube 39. A winder shaft 41 carrying a winding fork 42 projects into the interior tube 39 and is connected to the friction roller 40 by the agency of a slot 73 and a key 74.

The winder shaft 41 is supported at its upper end by the ball bearing 43 housed in a bush 75. Two lugs or pins 44 project from the housing 75 through the slots 36a of the tube 36. These pins 44 are engaged by the forked ends 46 of a control lever 45 (see Figures 1 and 11). The control lever is also pivotally connected to a vertical post 72 and carries a rotatably attached roller 47 which slidably engages the cam surface 5a of the stationary cam drum 2. Hence an alternating vertical motion of the winding fork 42 is produced during rotation of the machine by the agency of the cam surface 5a, roller 47, control lever 45, lugs 44 and shaft 41.

The rotary movement of the winding fork 42 is produced due to the frictional contact between the friction roller 40 and the friction guide rim 3a of ring 3. The rotary motion of the friction roller 40 is transmitted via the sleeve 40a, the key 74, the slot 73, the inner tube 39 and the winder shaft 41 to the winding fork 42. At the end 3b of the friction rim 3 the friction roller and the sleeve 40a are forced downward by a coil spring 48 axially mounted between the winder shaft 41 and the sleeve 40a. A claw clutch 50 actuated by a coil spring 49 arrests the downward movement of the winder shaft assuring thereby always the same predetermined position for the new rising movement so that the prongs of the winding fork laterally clear the vertical fleece when undergoing said rising movement.

The lifting of the friction roller 40 is effected by the agency of the inclined plane 3c (see Fig. 11). When the friction roller 40 reaches the top surface 3c (see Fig. 11) the spring 48 forces the roller 40 instantaneously into the operative position against the inner guide 3a. The prongs of the winding fork straddle the fleece 98 and wind a cut portion 95 thereof into a roll.

Prior to the winding operation the thread stretching and knotting device located in housing 70 (see Fig. 2) forms a loop around fleece 98 and knots the loop. Subsequent thereto the winding fork while in the raised position (see Fig. 7) starts winding the cut fleece 98 together with the thread whereby the knot of the thread is slipped off the thread stretching and knotting device. The fork 42 is then moved downwardly by the action of lever 45 on lugs 44 so that it will be out of the way of ejecting member 61.

The ejecting member 61 is secured to an internal shaft 61a (see Figures 2 and 11) rotatably mounted inside the hollow cutter shaft 33. A pawl 62 is secured to the lower end of the shaft 61a and is swivelled by a stationary stop (not shown) of the stationary cam drum 2 so that the wound pad of cotton-wool or the like is ejected from the tool plate 13 by the ejector 61 subsequent to the lowering of the winding fork 42.

The various operative steps of the four sets of tools mounted on the tool plate 13 of the machine are schematically illustrated in Fig. 10. The cotton fleece 98 is shaped as a thin band and extends from a supply holder (not shown) over the rollers 96 to the rotatable tool plate 13 of the machine. The cotton fleece is moved against the press plates 15. The clamping jaws 17a and 17b are then raised by the lever arm 28 through the opening 16 of the tool plate 13. The jaw surfaces are then swivelled towards the press plates 15 by the action of lever arm 23 whereby the cotton fleece 98 is clamped in the position indicated at "A" in Fig. 10. As the tool plate 13 continues to rotate, the cutter 31 tears the freely stretched fleece 98. The thread stretching and knotting device 70 then puts a loop and knot around the fleece, the winding fork 42 is next raised upwardly at "B" and grasps the cut fleece and thread 95. As the rotatable tool plate 13 continues its travel, the clamping jaws 17a and 17b are moved away from the cotton fleece at "C" whereupon the winding fork commences to wind at "D" the pad 95. When the pad has been completely wound the winding fork 42 is lowered and the ejecting member 61 swings the wound pad 95 off the tool plate 13 in the direction of the arrow "E."

As the machine continues to rotate the operational cycle is repeated. It should be noted that the pair of clamping jaws subsequent to the ejection of pad 95 and prior to the beginning of a new operational cycle are in the position "F" of Fig. 10, having been moved down through opening 16 below the tool plate 13 to permit the placing of the cotton fleece 98 against the press plates 15.

In Figs. 8 to 14 a modified version of the device is illustrated. The clamping is here effected by two pins 80, 81 which can be raised or lowered by the action of one single lever 83. The two pins 80 and 81 are attached to a carrier member 66 which, in turn, is pivotally connected by the agency of a pivot 85a to the cam following lever 83 and also slidably connected to the guide member 82. The lever 83 is pivotally connected at pivot 84 to a post 36. A roller 85 rotatably connected to the lever 83 slides along a cam groove 86 of the stationary cam drum 2a. Two clamping members 87 and 88 are swivellably mounted on the tool plate 13' respectively opposite the pins 80 and 81. Each clamping member is provided with a rubber buffer 89. The clamping members 87 and 88 have arms 80a and 81a extending respectively therefrom.

Rollers 90 and 91 are respectively rotatably mounted on arms 80a and 81a and move slidably in their respective grooves 5b' and 5b". Cams of cam drum 2a swivel the clamping members 87 and 88 toward the pins 80 and 81 (see Figs. 12 to 14) and clamp the fleece 98 (shown in dotted lines in Fig. 9).

Similar to the embodiment illustrated in Figs. 1 and 2 a cutter 31a is rotatably mounted between the clamping members 87 and 88. The cutter 31a has an arm 92a rotatably supporting a roller 92 which slides along a groove 5c' of the stationary cam drum 2a. In this embodiment the carrier member 66 also supports the winder shaft 41' and the winding fork 42' extending therefrom. The winder shaft 41' is driven by the agency of a friction pulley 40a which bears against a stationary friction rim (not shown) similar to the embodiment illustrated in Figs. 1 and 2. The thread stretching and knotting device 70 is housed in member 93 which serves also to contain the cut fleece 95 while the same is wound by the winding fork 42'.

The various operative steps of four sets of tools of the embodiment of Figs. 8 and 9, are illustrated schematically in Figs. 12 to 14.

It should be noted however that in Figures 10 and 12 to 14 the tool groups are arranged in sets of four, and for the sake of simplicity not all the tools are shown in the drawings. Obviously any number of tool groups may be mounted in the machine, a limitation on the number of tool groups being imposed only by the size of the machine. In Fig. 12 the fleece 98 is placed on the tool plate 13'. Due to the rotation of the plate 13' the fleece advances to the position shown in Figure 13 and is then cut by the cutter 31a as illustrated. Upon further rotation of the plate 13' the winding fork 42' is actuated and the pad 95 together with a thread emanating from housing 93 is wound as illustrated in Figure 14. The embodiment of Figures 8 and 9 is in all respects, except those enumerated above, equal to the embodiment of Figures 1 and 2.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptions should and are intended to be comprehended within the meaning and range of equivalence of the following claims.

What is claimed as new and desired to be secured by Letters Patent is:

1. A machine including a thread stretching and knotting device for cutting and winding fleece and thread into pads of predetermined size; comprising in combination, means for feeding an elongated strip of fleece material, a rotatable base, clamping means operatively connected to to said base in the path of feed of said fleece material, spool means mounted on said base for winding said fleece material and thread from said thread stretching and knotting device, said spool means being movable out of the path of feed of said fleece material, and ejector means mounted on said base adapted to eject wound fleece material and thread after said spool means have moved out of the path of feed of said fleece material.

2. A machine having a thread stretching and knotting device for cutting and winding fleece into pads of predetermined size; comprising in combination, a stationary base having cam means, a plate mounted for rotation on said base, driving means operatively connected to said rotatable plate, means for feeding an elongated strip of fleece material onto the rotatable plate, clamping means operatively connected to said rotatable plate, said clamping means having first cam following means slidingly abutting against said cam means, said clamping means being adapted to clamp said strip of fleece material in position, said thread stretching and knotting device being adapted to place a thread around said clamped fleece material and knotting said thread, cutting means operatively connected to said rotatable plate, said cutting means having second cam following means slidingly abutting against said cam means and being adapted to move crosswise to the path of feed of said fleece material thereby to cut the same, and winding means operatively connected to said rotatable plate, said winding means having combination rotating and cam following means slidingly abutting against said cam means, said combination rotating and cam following means being adapted to wind said cut fleece material and thread and being further adapted to move thereupon out of the path of feed of said fleece material, and ejecting means operatively connected to said rotatable plate for ejecting said wound material.

3. A machine having a thread stretching and knotting device for cutting and winding fleece into pads of predetermined size; comprising in combination, a stationary base having cam means, a plate rotatably mounted on said base, driving means operatively connected to said rotatable plate, means for feeding an elongated strip of fleece material onto said rotatable plate, clamping means operatively connected to said rotatable plate, said clamping means having first cam following means slidingly abutting against said cam means, said clamping means being adapted to clamp said strip of fleece material, said thread stretching and knotting device thereupon placing a thread around said clamped fleece material and knotting said thread, cutting means operatively connected to said rotatable plate, said cutting means having second cam following means slidingly abutting against said cam means, said cutting means being adapted to move crosswise to the path of feed of said fleece material and thereby cut the same, winding means operatively connected to said rotatable plate, said winding means having combination rotating and cam following means slidingly abutting against said cam means, said combination rotating and cam following means being adapted to wind said cut fleece material and thread, and being further adapted to move thereupon out of the path of feed of said fleece material, ejecting means operatively connected to said rotatable plate for ejecting said wound material, said ejecting means being operatively connected to said rotatable plate and having third cam following means slidingly abutting against said cam means, said ejecting means being adapted to eject said wound fleece material from said rotatable plate.

References Cited in the file of this patent

UNITED STATES PATENTS

| 2,384,983 | Weiss | Sept. 18, 1945 |
| 2,510,786 | Weiss | June 6, 1950 |
| 2,763,899 | Niepmann et al. | Sept. 25, 1956 |

FOREIGN PATENTS

| 137,363 | Australia | May 23, 1950 |